US009273578B2

(12) United States Patent
Seyler et al.

(10) Patent No.: US 9,273,578 B2
(45) Date of Patent: Mar. 1, 2016

(54) CATALYTIC CONVERTER FOR THE SELECTIVE CATALYTIC REDUCTION OF NITROGEN OXIDES IN THE EXHAUST GAS OF DIESEL ENGINES

(75) Inventors: Michael Seyler, Rodenbach (DE); Nicola Soeger, Nidderau (DE); Katja Adelmann, Darmstadt (DE); Paul Spurk, Weiterstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/112,463

(22) PCT Filed: Jun. 6, 2012

(86) PCT No.: PCT/EP2012/060657
§ 371 (c)(1),
(2), (4) Date: Oct. 17, 2013

(87) PCT Pub. No.: WO2012/168277
PCT Pub. Date: Dec. 13, 2012

(65) Prior Publication Data
US 2014/0041366 A1  Feb. 13, 2014

(30) Foreign Application Priority Data
Jun. 7, 2011 (EP) .................................. 11004607

(51) Int. Cl.
*F01N 3/00* (2006.01)
*F01N 3/10* (2006.01)
(Continued)

(52) U.S. Cl.
CPC .............. *F01N 3/10* (2013.01); *B01D 53/9418* (2013.01); *B01J 23/002* (2013.01); *B01J 29/763* (2013.01);
(Continued)

(58) Field of Classification Search
CPC ............ B01J 29/85; B01J 29/88; B01J 29/06; B01J 29/18; B01J 29/08; B01J 23/002; B01J 29/763; B01J 29/84; B01J 35/0006; B01J 35/04; B01J 37/0244; B01J 37/0246; B01J 37/038; B01J 37/04; F01N 3/10; F01N 3/18; F01N 3/20; F01N 3/035; F01N 3/2066; B01D 53/565; B01D 53/944; B01D 53/9472; B01D 53/9418
USPC .......... 423/213.2, 239.1, 212; 502/73, 74, 78, 502/79, 64–66; 60/272–324; 422/168, 170, 422/171
See application file for complete search history.

(56) References Cited

U.S. PATENT DOCUMENTS

| 4,782,039 A | 11/1988 | Lindsey |
| 4,961,917 A | 10/1990 | Byrne |
| 5,552,128 A * | 9/1996 | Chang et al. ................... 423/235 |
| 6,468,941 B1 | 10/2002 | Bortun et al. |
| 6,713,031 B2 | 3/2004 | Harris et al. |
| 6,843,971 B2 | 1/2005 | Schäfer-Sindlinger et al. |

(Continued)

FOREIGN PATENT DOCUMENTS

| EP | 0 246 859 A1 | 11/1987 |
| EP | 0 385 164 B1 | 10/1993 |

(Continued)

OTHER PUBLICATIONS

International Search Report for Application No. PCT/EP2012/060657 dated Aug. 16, 2012 (in English).

*Primary Examiner* — Jesse Bogue
*Assistant Examiner* — Kelsey Stanek
(74) *Attorney, Agent, or Firm* — Smith, Gambrell & Russell, LLP

(57) ABSTRACT

The present invention relates to a catalytic converter which comprises a molecular sieve and a mixed oxide, and to a method for the selective catalytic reduction of nitrogen oxides in exhaust gases of diesel engines.

10 Claims, 3 Drawing Sheets a)

b)

Figure 1:
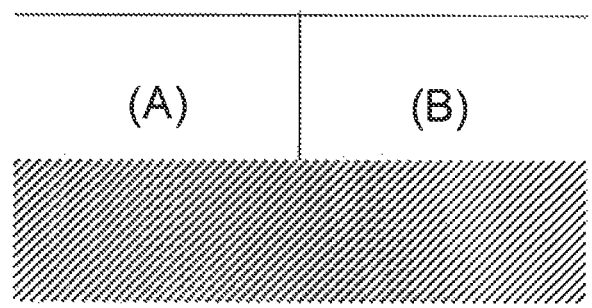
Figure 1:
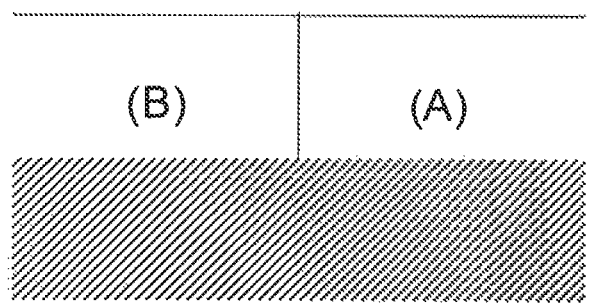

(51) Int. Cl.

| | |
|---|---|
| *B01J 29/85* | (2006.01) |
| *B01D 53/94* | (2006.01) |
| *B01J 37/02* | (2006.01) |
| *B01J 37/03* | (2006.01) |
| *B01J 37/04* | (2006.01) |
| *B01J 35/00* | (2006.01) |
| *B01J 23/00* | (2006.01) |
| *B01J 29/76* | (2006.01) |
| *B01J 29/84* | (2006.01) |
| *B01J 35/04* | (2006.01) |

(52) U.S. Cl.
CPC ........ *B01J 29/84* (2013.01); *B01J 29/85* (2013.01); *B01J 35/0006* (2013.01); *B01J 35/04* (2013.01); *B01J 37/0244* (2013.01); *B01J 37/0246* (2013.01); *B01J 37/038* (2013.01); *B01J 37/04* (2013.01); *B01D 2255/2061* (2013.01); *B01D 2255/2065* (2013.01); *B01D 2255/20715* (2013.01); *B01D 2255/20761* (2013.01); *B01D 2255/20776* (2013.01); *B01D 2255/50* (2013.01); *B01D 2255/9032* (2013.01); *B01J 2229/186* (2013.01); *B01J 2229/42* (2013.01); *B01J 2523/00* (2013.01); *Y02T 10/24* (2013.01)

(56) References Cited

U.S. PATENT DOCUMENTS

| | | | |
|---|---|---|---|
| 6,914,026 | B2 | 7/2005 | Tran et al. |
| 7,332,148 | B2 | 2/2008 | Tran et al. |
| 7,601,662 | B2 * | 10/2009 | Bull et al. .............. 502/60 |
| 2003/0073566 | A1 * | 4/2003 | Marshall et al. ........... 502/64 |
| 2005/0196333 | A1 | 9/2005 | Schäfer-Sindlinger et al. |
| 2008/0095682 | A1 | 4/2008 | Kharas et al. |
| 2010/0034717 | A1 | 2/2010 | Adelmann et al. |
| 2010/0111793 | A1 | 5/2010 | Mori et al. |
| 2011/0142737 | A1 * | 6/2011 | Seyler et al. .......... 423/213.2 |
| 2011/0146237 | A1 | 6/2011 | Adelmann et al. |
| 2011/0173950 | A1 * | 7/2011 | Wan et al. .............. 60/274 |
| 2013/0121902 | A1 | 5/2013 | Adelmann et al. |
| 2014/0093442 | A1 * | 4/2014 | Spreitzer et al. ........ 423/239.1 |

FOREIGN PATENT DOCUMENTS

| | | |
|---|---|---|
| EP | 1 153 648 A1 | 11/2001 |
| EP | 1 147 801 B1 | 9/2004 |
| EP | 1 495 804 A1 | 1/2005 |
| EP | 2 072 120 A1 | 6/2009 |
| EP | 2 116 293 A1 | 11/2009 |
| EP | 2 335 810 B1 | 6/2011 |
| WO | 2008/049491 A1 | 5/2008 |
| WO | 2008/051752 A2 | 5/2008 |
| WO | 2011/131324 A1 | 10/2011 |

* cited by examiner a)

b)

a)

b)

CATALYTIC CONVERTER FOR THE SELECTIVE CATALYTIC REDUCTION OF NITROGEN OXIDES IN THE EXHAUST GAS OF DIESEL ENGINES

The present invention relates to a catalyst for selective catalytic reduction of nitrogen oxides in exhaust gases of diesel engines with ammonia.

The exhaust gas of diesel engines comprises soot particles (PM) and nitrogen oxides ($NO_x$), as well as the carbon monoxide (CO) and hydrocarbon (HC) pollutant gases resulting from incomplete combustion of the fuel. In addition, the exhaust gas of diesel engines contains up to 15% by volume of oxygen. It is known that the oxidizable CO and HC pollutant gases can be converted to harmless carbon dioxide ($CO_2$) by passing them over a suitable oxidation catalyst, and particulates can be removed by passing the exhaust gas through a suitable soot particle filter.

A known process for removal of nitrogen oxides from exhaust gases in the presence of oxygen is the process for selective catalytic reduction (SCR process) by means of ammonia over a suitable catalyst, the SCR catalyst. In this process, the nitrogen oxides to be removed from the exhaust gas are reacted with ammonia to give nitrogen and water. The ammonia used as the reducing agent can be produced as a secondary emission in the exhaust gas system, or it is made available by metered addition of a precursor compound from which ammonia can be formed, for example urea, ammonium carbamate or ammonium formate, to the exhaust gas line and subsequent hydrolysis.

For performance of the latter variation of the SCR process, a source for provision of the reducing agent, an injection device for metered addition of the reducing agent to the exhaust gas as required, and an SCR catalyst disposed in the flow path of the exhaust gas are needed. The totality of reducing agent source, SCR catalyst and injection device arranged on the inflow side with respect to the SCR catalyst is also referred to as SCR system.

For cleaning of the diesel exhaust gases in motor vehicles, the SCR system is usually used in combination with other exhaust gas cleaning units such as oxidation catalysts and diesel particulate filters. This gives rise to many different options for exhaust gas system configuration. According to the installation position of the SCR system, and more particularly according to the arrangement of the SCR catalyst in the flow path of the exhaust gas, different demands are made on the performance and aging stability thereof. Consequently, the prior art has described a multitude of SCR catalysts which are suitable for reducing the nitrogen oxide content in the exhaust gas of diesel engines and which have usually been optimized in accordance with the specific demands of the respective exhaust gas system configuration.

The use of zeolite-based SCR catalysts is known from numerous publications. For example, U.S. Pat. No. 4,961,917 describes a method for reduction of nitrogen oxides with ammonia using a catalyst which, as well as a zeolite with defined properties, comprises iron and/or copper as a promoter. Further SCR catalysts based on transition metal-exchanged zeolites and processes for selective catalytic reduction using such SCR catalysts are described, for example, in EP 1 495 804 A1, U.S. Pat. No. 6,914,026 B2 or EP 1 147 801 B1.

While zeolite-based SCR catalysts are used especially in discontinuously operating SCR systems in which the ammonia used as the reducing agent is produced exclusively as a secondary emission in the exhaust gas system, attempts are made to avoid them in exhaust gas cleaning systems in which ammonia is supplied continuously via a precursor compound because of the high production costs thereof.

For the latter systems, suitable SCR catalysts are those which comprise vanadium oxide as well as titanium dioxide or tungsten oxide or mixtures thereof. For example, EP 385 164 B1 describes such a catalyst which comprises, as well as titanium dioxide, at least one oxide of tungsten, silicon, boron, aluminum, phosphorus, zirconium, barium, yttrium, lanthanum or cerium, and at least one oxide of vanadium, niobium, molybdenum, iron or copper, and which is produced in the form of a shaped body by compression or extrusion of the components, optionally after addition of suitable assistants. Further catalysts of this kind are known, for example, from EP 1 153 648 A1 and EP 246 859 A1.

A significant problem in the case of use of the vanadium-containing SCR catalysts for cleaning of the exhaust gases of motor vehicles is the possible emission of volatile, toxic vanadium compounds at relatively high exhaust gas temperatures. There have already been prolonged efforts to provide inexpensive vanadium-free SCR catalysts. For instance, some mixed oxide compositions based on cerium-zirconium mixed oxide and the use thereof in the SCR reaction are known in the prior art. In this regard, reference is made, for example, to WO 2008/049491, WO 2008/051752, EP 2 116 293 A1 and EP 2 072 120 A1.

Cerium-zirconium mixed oxides doped with rare earth sesquioxides ($RE_2O_3$) are described in U.S. Pat. No. 6,468,941 B1 but are not used therein for catalysis of the selective catalytic reduction of nitrogen oxides, but as materials which conduct oxygen ions or store oxygen in three-way catalytic converters.

It is an object of the present invention to provide a catalyst for selective catalytic reduction of nitrogen oxides in diesel engine exhaust gases with ammonia, which is notable particularly for an improved conversion activity in the reduction of $NO_x$ with ammonia in the temperature region of more than 350° C. with simultaneously excellent selectivity for nitrogen. In the region of below 350° C., especially in the low-temperature region between 150° C. and 250° C., activity losses compared to conventional catalysts should be observed to an acceptable degree at worst, if at all.

It has now been found that, surprisingly, this object is achieved by combination of particular molecular sieves with particular mixed oxides in particular ratios.

The present invention thus relates to a catalyst comprising
a) a molecular sieve selected from the group consisting of chabazite, SAPO-34 and ALPO 34, containing 1 to 10% by weight of copper calculated as copper(II) oxide and based on the total weight of the molecular sieve; and
b) a mixed oxide consisting of
oxides of cerium, of zirconium, of niobium and of one or more rare earth elements or of
oxides of cerium, of zirconium, of niobium, of tungsten and of one or more rare earth elements;
characterized in that the weight ratio between molecular sieve and mixed oxide is 3:1 to 10:1.

Preferred inventive catalysts comprise molecular sieves having a mean pore size of less than 4 ångström (Å).

Further preferred inventive catalysts comprise ALPO-34 as the molecular sieve. ALPO-34 is a zeolite-like aluminophosphate with chabazite structure, which, just like chabazite and SAPO-34, is known to those skilled in the art and is commercially available.

Further preferred inventive catalysts comprise molecular sieves having a copper content of 1 to 5% by weight, calculated as copper(II) oxide and based on the total weight of the molecular sieve.

Preferred inventive catalysts comprise mixed oxides composed of cerium oxide in an amount of 15 to 50% by weight, calculated as $CeO_2$, niobium oxide in an amount of 3 to 25% by weight, calculated as $Nb_2O_5$, rare earth oxide in an amount of 3 to 10% by weight, calculated as $RE_2O_3$, and zirconium oxide in an amount of 15 to 79% by weight, calculated as $ZrO_2$.

Particularly preferred inventive catalysts comprise mixed oxides composed of cerium oxide in an amount of 25 to 45% by weight, calculated as $CeO_2$, niobium oxide in an amount of 3 to 20% by weight, calculated as $Nb_2O_5$, rare earth oxide in an amount of 3 to 10% by weight, calculated as $RE_2O_3$, and zirconium oxide in an amount of 25 to 69% by weight, calculated as $ZrO_2$.

Very particularly preferred inventive catalysts comprise mixed oxides composed of cerium oxide in an amount of 35 to 40% by weight, calculated as $CeO_2$, niobium oxide in an amount of 10 to 15% by weight, calculated as $Nb_2O_5$, rare earth oxide in an amount of 3 to 6% by weight, calculated as $RE_2O_3$, and zirconium oxide in an amount of 39 to 52% by weight, calculated as $ZrO_2$.

If the inventive catalysts comprise tungsten oxide-containing mixed oxides, the latter are preferably composed of cerium oxide in an amount of 15 to 35% by weight, calculated as $CeO_2$, niobium oxide in an amount of 3 to 10% by weight, calculated as $Nb_2O_5$, rare earth oxide in an amount of 3 to 10% by weight, calculated as $RE_2O_3$, tungsten oxide in an amount of 4 to 25% by weight, calculated as $WO_3$, and zirconium oxide in an amount of 15 to 60% by weight, calculated as $ZrO_2$.

More preferably, tungsten oxide-containing mixed oxides are composed of cerium oxide in an amount of 20 to 35% by weight calculated as $CeO_2$, niobium oxide in an amount of 4 to 9% by weight calculated as $Nb_2O_5$, rare earth oxide in an amount of 3 to 8% by weight calculated as $RE_2O_3$, tungsten oxide in an amount of 10 to 20% by weight calculated as $WO_3$, and zirconium oxide in an amount of 40 to 55% by weight calculated as $ZrO_2$.

The stated amounts are each based on the total amount of the mixed oxide, RE represents a rare earth element.

Further preferred inventive catalysts comprise mixed oxides composed of 15 to 50% by weight of $CeO_2$, 3 to 25% by weight of $Nb_2O_5$, 3 to 10% by weight of $RE_2O_3$ and 15 to 79% by weight of $ZrO_2$.

Further particularly preferred inventive catalysts comprise mixed oxides composed of 25 to 45% by weight of $CeO_2$, 3 to 20% by weight of $Nb_2O_5$, 3 to 10% by weight of $RE_2O_3$ and 25 to 69% by weight of $ZrO_2$.

Further very particularly preferred inventive catalysts comprise mixed oxides composed of 35 to 40% by weight of $CeO_2$, 10 to 15% by weight of $Nb_2O_5$, 3 to 5% by weight of $RE_2O_3$ and 39 to 52% by weight of $ZrO_2$.

In further preferred inventive catalysts comprising tungsten oxide-containing mixed oxides, the latter are composed of 15 to 35% by weight of $CeO_2$, 3 to 10% by weight of $Nb_2O_5$, 3 to 10% by weight of $RE_2O_3$, 4 to 25% by weight of $WO_3$ and 15 to 60% by weight of $ZrO_2$.

In further particularly preferred inventive catalysts comprising tungsten oxide-containing mixed oxides, the latter are composed of 20 to 35% by weight of $CeO_2$, 4 to 9% by weight of $Nb_2O_5$, 3 to 8% by weight of $RE_2O_3$, 10 to 20% by weight of $WO_3$ and 40 to 55% by weight of $ZrO_2$.

Here too, the stated amounts are each based on the total amount of the mixed oxide. RE represents a rare earth element.

Preferred rare earth elements RE are especially yttrium, ytterbium, lanthanum, praseodymium, neodymium, samarium, terbium and erbium. Particular preference is given to yttrium and neodymium, which are used especially in the form of yttrium sesquioxide $Y_2O_3$ or neodymium sesquioxide $Nd_2O_3$.

The mixed oxides can be produced by very simple means. For example, a suitable mixed oxide is obtained by impregnating a commercially available cerium-zirconium mixed oxide doped with rare earth oxide for stabilization with an aqueous solution of a water-soluble niobium compound and optionally of a water-soluble tungsten compound, and subsequent calcination of the (moist) powder thus obtained.

However, other processes known to those skilled in the art for production of the mixed oxides according to the claims are also usable.

The weight ratio between molecular sieve and mixed oxide is especially 3:1 to 9:1.

In a particularly advantageous version of the present invention, the inventive catalyst composed of molecular sieve and mixed oxide is in the form of at least one coating on a catalytically inert support body.

Suitable catalytically inert support bodies are in principle all known support bodies for heterogeneous catalysts. Preference is given to monolithic and monolith-like flow honeycombs made from ceramic and metal, and to particulate filter substrates as typically used for cleaning of diesel engine exhaust gases. Very particular preference is given to ceramic flow honeycombs and ceramic wall flow filter substrates made from cordierite, aluminum titanate or silicon carbide.

Molecular sieve and mixed oxide may be present in one layer, i.e. in a mixture, or in spatial separation in different layers on the support body. According to the target application, it may be particularly advantageous to use what are called "zone catalysts" in which the catalytically active coatings take the form of a horizontal succession of layers (called zones) on the support body in the flow direction of the exhaust gas (FIG. 1). However, what are called "layer catalysts" may also be preferable, in which the catalytically active coatings are arranged as vertically superposed layers on the support body over the entire length of the support body (FIG. 2).

Figure 2:
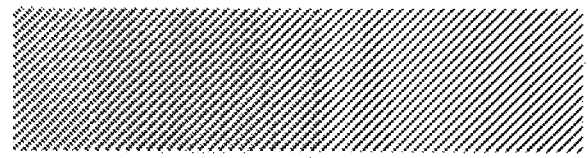
Figure 2:
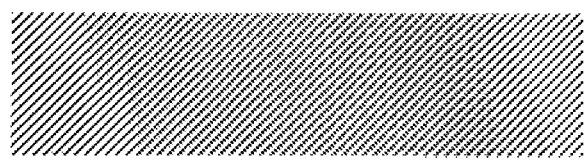

FIGS. 1 and 2 show embodiments in which (A) is the coating comprising the mixed oxide, while (B) is the coating which has been applied in spatial separation therefrom and comprises the molecular sieve.

In the embodiments according to FIG. 1a) and FIG. 2a), the coating comprising the mixed oxide is the first to come into contact with the incoming exhaust gas, whereas, in the embodiments according to FIG. 1b) or 2b), the coating comprising the molecular sieve is the first to come into contact with the incoming exhaust gas.

Which specific configuration of the catalyst should be selected to achieve the best possible exhaust gas cleaning outcome depends on the operating conditions of the catalyst in the target application, and can be determined after an evaluation by the person skilled in the art by the known standard methods.

The inventive catalysts feature high $NO_x$ conversion rates within the temperature region of more than 350° C. with simultaneously excellent selectivity for nitrogen. In the region of below 350° C., especially in the low-temperature region between 150 and 250° C., activity losses compared to conventional catalysts are observed only to a minor extent.

The present invention therefore also provides a process for selective catalytic reduction of nitrogen oxides in exhaust gases of diesel engines, by
adding ammonia or a precursor compound from which ammonia can be formed from a source independent of the engine to the exhaust gas which comprises nitrogen oxides and is to be cleaned and passing the mixture produced in step a.) over a catalyst, characterized in that the catalyst comprises a) a molecular sieve selected from the group consisting of chabazite, SAPO-34 and ALPO-34, containing 1 to 10% by weight of copper, based on the total weight of the molecular sieve; and b) a mixed oxide consisting of oxides of cerium, of zirconium, of niobium and of one or more rare earth elements or of oxides of cerium, of zirconium, of niobium, of tungsten and of one or more rare earth elements.

The invention is explained in more detail hereinafter by means of figures and examples. The figures show:

FIG. 1: embodiments of inventive zone catalysts wherein (A) represents the catalytically active coating comprising the mixed oxide, while (B) represents a spatially separate catalytically active coating comprising a molecular sieve; what is shown in schematic form is a section from a monolithic flow honeycomb whose flow channels are separated by gas-impervious walls, on which the catalytically active coatings (A) and (B) have been applied.

FIG. 2: embodiments of inventive layer catalysts wherein (A) represents the catalytically active coating comprising the mixed oxide, while (B) represents a spatially separate catalytically active coating comprising a molecular sieve; what is shown in schematic form is a section from a monolithic flow honeycomb whose flow channels are separated by gas-impervious walls, on which the catalytically active coatings (A) and (B) have been applied.

Figure 3:
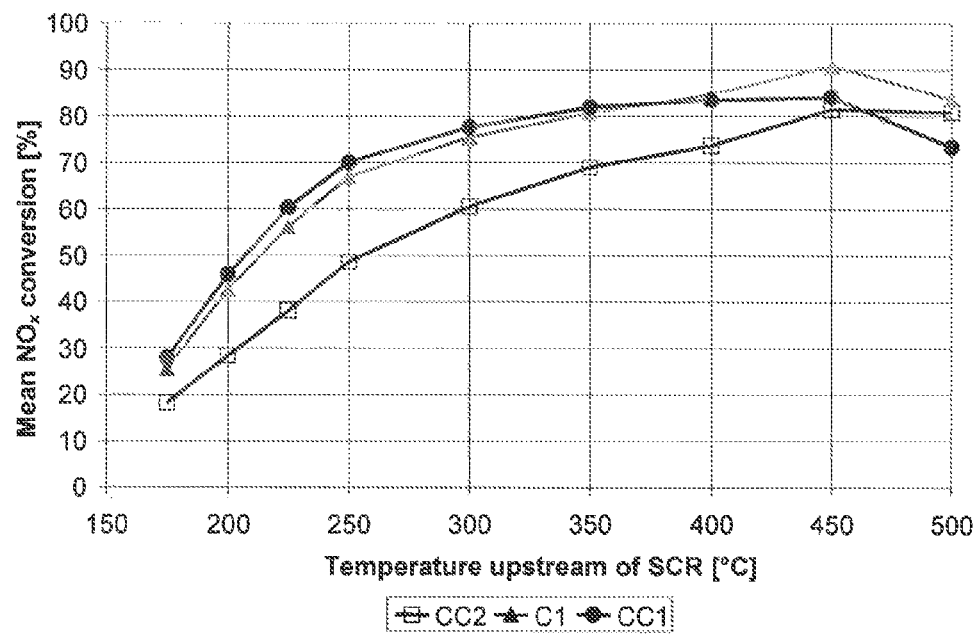

FIG. 3: comparison of the nitrogen oxide conversions in the SCR reaction between the inventive catalyst C1 and the comparative catalysts CC1 and CC2.

Figure 4:
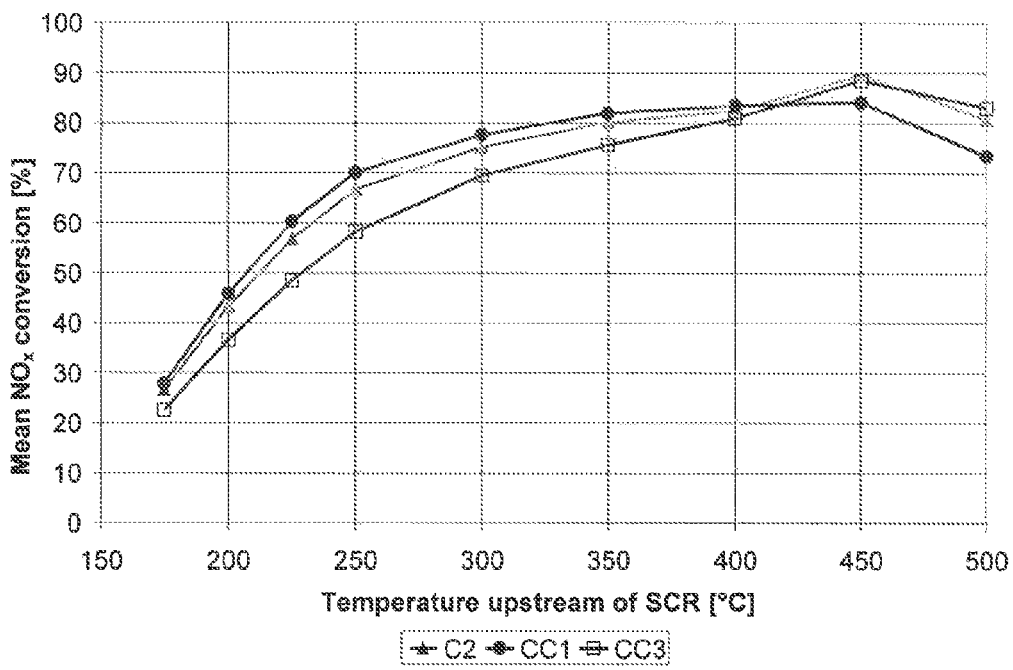

FIG. 4: comparison of the nitrogen oxide conversions in the SCR reaction between the inventive catalyst C2 and the comparative catalysts CC1 and CC3.

To produce the catalysts described in the examples which follow, molecular sieve and mixed oxide, in a mixture or separately according to the embodiment, were suspended in water, ground and applied in one or more layers or in zones to a ceramic honeycomb having a capacity of 0.5 L and a cell count of 62 cells per square centimeter with a wall thickness of 0.17 mm. After calcining the honeycomb at 500° C. for a period of two hours in air, cylindrical drill cores were taken from the coated honeycomb for testing in a model gas system with a diameter of 25.4 mm and a length of 76.2 mm.

To study the catalytic activity of the supported catalysts produced, a dynamic activity test was undertaken in a laboratory model gas system. In this test, the following test gas composition was established:

| Constituent | Gas mixture | | |
| --- | --- | --- | --- |
| | Gas mixture 1 | Gas mixture 2 | Gas mixture 3 |
| $O_2$ [% by vol.]: | 10 | 10 | 10 |
| NO [ppmv]: | 500 | 500 | 0 |
| $NH_3$ [ppmv]: | 0 | 750 | 0 |
| CO [ppmv]: | 350 | 350 | 350 |
| $C_3H_6$ [ppmv]: | 100 | 100 | 100 |
| $H_2O$ [ppmv]: | 5 | 5 | 5 |
| $N_2$ [% by vol.]: | remainder | remainder | remainder |
| Space velocity [$h^{-1}$] | 60000 | 60000 | 60000 |

The test was conducted at three different temperatures which were matched to the most application-relevant target temperature range for an SCR system connected downstream of other exhaust gas cleaning units in an exhaust gas system, namely at 175° C., 250° C. and 300° C. At each temperature, a cycle of four different phases was run through, these being referred to hereinafter as phases A to D:

Phase A: gas mixture 1; duration: 5 minutes

Phase B, NH3-SCR phase: gas mixture 2; duration: up to an NH3 breakthrough of 20 ppmv or stoppage after time;

Phase C, gas mixture 3; emptying of the NH3 store by means of temperature ramp to 500° C.;

Phase D, gas mixture 3; establishment of the next measurement temperature.

Within one cycle, the catalyst temperature was first regulated to the defined target temperature. Then the catalyst was contacted with gas mixture 1 for 5 minutes (phase A). In phase B, the gas mixture was switched to gas mixture 2 in order to determine the $NH_3$-SCR conversion. This phase was stopped either on detection of an $NH_3$ breakthrough of 20 ppmv or ended on the basis of a time criterion fixed beforehand. Then gas mixture 3 was established and the catalyst was heated to 500° C. in order to empty the ammonia store (phases C). Subsequently, the catalyst was cooled down to the next measurement temperature to be examined (phases D); the next cycle began with phase A through setting of gas mixture 1 after establishment of the target temperature. The dynamic $NO_x$ conversion was determined upstream of and downstream of catalyst for all three measurement temperatures from the concentrations of the corresponding exhaust gas components determined during phase B. For this purpose, a mean $NO_x$ conversion over this phase was calculated, taking account of the $N_2O$ formation, as follows:

$$U_{mean, N_2O\ corr} = \left[1 - \frac{c_{NO_x, mean}^{post-cat} + 2 \cdot c_{N_2O, mean}^{post-cat}}{c_{NO_x, mean}^{pre-cat} + 2 \cdot c_{N_2O, mean}^{pre-cat}}\right] \cdot 100\%$$

The nitrogen oxide conversion values $C_{NOx}$ [%] obtained were plotted as a function of the temperature measured upstream of catalyst to assess the SCR activity of the materials examined.

The following catalysts were prepared:

COMPARATIVE EXAMPLE 1

Comparative Catalyst CC1

A coating suspension was produced by suspending commercially available SAPO-34 in water and adding an aqueous copper(II) nitrate solution. The amount of the copper nitrate solution added was calculated such that the finished catalyst contained 2% by weight of Cu, based on the total weight of the exchanged SAPO-34. To complete the ion exchange, the suspension was stirred for 30 minutes and then, after addition of silica sol as a binder, applied directly to a ceramic flow honeycomb having 62 cells per square centimeter and a cell wall thickness of 0.165 millimeter, which had a diameter of 92.96 millimeters and a length of 76.2 millimeters. The amount applied was 139.1 g/L. The honeycomb thus coated was dried at 90° C., calcined at 350° C. and heat treated under air at 640° for 2 hours.

EXAMPLE 1

Catalyst C1

In the first step, analogously to the procedure in the preparation of CC1, a layer of Cu-exchanged SAPO-34 was applied in an amount of 139.1 g/L. Applied to this catalyst in the second step was a mixed oxide consisting of 15% by weight of $WO_3$, 46.75% by weight of $ZrO_2$, 27.2% by weight of $CeO_2$, 5.1% by weight of $Y_2O_3$ and 5.95% by weight of $Nb_2O_3$ in an amount of 15.9 g/L, such that a coated catalyst according to FIG. 2a was obtained, with the Cu molecular sieve in the lower layer and the mixed oxide component in the upper layer.

COMPARATIVE EXAMPLE 2

Comparative Catalyst CC2

The process described in Example 1 was repeated, except that the mixed oxide was applied in an amount of 63.4 g/L in the second step.

The washcoat loadings of the various layers for C1, CC1 and CC2 were thus as follows:

|  | Cu-SAPO-34 loading of the lower layer [g/L] | Mixed oxide loading of the upper layer [g/L] |
| --- | --- | --- |
| CC2 | 139.1 | 63.4 |
| C1 | 139.1 | 15.9 |
| CC1 | 139.1 | 0 |

A drill core with diameter 25.4 mm and length 76.2 mm was taken from each of catalysts C1, CC1 and CC2, hydrothermally aged at 750° C. in a gas mixture of 10% $H_2O$, 10% $O_2$, remainder $N_2$, for 16 h, and then analyzed in a dynamic activity test.

The results are shown in FIG. 3. According to these, the inventive catalyst C1 shows a much better $NO_x$ conversion activity at temperatures above 350° C. compared to the comparative catalysts CC1 and CC2. At temperatures below 350° C., C1 is of about equal activity to CC1 and is much more active than CC2.

EXAMPLE 2

Catalyst C2

A mixed coating suspension composed of Cu-SAPO-34 (2% Cu, based on the total weight of the exchanged SAPO-34) and a mixed oxide component consisting of 15% by weight of $WO_3$, 46.75% by weight of $ZrO_2$, 27.2% by weight of $CeO_2$, 5.1% by weight of $Y_2O_3$ and 5.95% by weight of $Nb_2O_3$ was produced. The ratio of Cu-SAPO-34 to mixed oxide in the suspension was 8.7:1. This suspension was used for coating of ceramic flow honeycombs having 62 cells per square centimeter, a cell wall thickness of 0.165 millimeter, a diameter of 92.96 millimeters and a length of 76.2 millimeters. The honeycomb thus coated was dried at 90° C., calcined at 350° C. and heat treated at 640° under air for 2 hours. The washcoat loading of Cu-SAPO-34 on the finished catalyst C3 was 139.1 g/L, and the washcoat loading of mixed oxide 15.9 g/L.

COMPARATIVE EXAMPLE 3

Comparative Catalyst CC3

Analogously to the procedure in the preparation of C2 according to example 2, the mixed catalyst CC3 was prepared. The ratio of Cu-SAPO-34 to mixed oxide in the suspension in this case was 2.2:1. The washcoat loading of Cu-SAPO-34 on the finished catalyst CC3 was 139.1 g/L, and the washcoat loading of mixed oxide 63.4 g/L.

A drill core having diameter 25.4 mm and length 76.2 mm was taken from each of catalysts C2 and CC3, hydrothermally aged at 750° C. in a gas mixture of 10% $H_2O$, 10% $O_2$, remainder $N_2$, for 16 h, and then analyzed in a dynamic activity test and compared with the result of CC1.

The results are shown in FIG. 4. According to these, the inventive catalyst C2 shows a much better $NO_x$ conversion activity compared to the comparative catalyst CC1 at temperatures above 350° C. Comparative catalyst CC3 is comparable at these temperatures, but much worse at temperatures below 350° C. C2 and CC1 are comparable at these temperatures.

Analogously to the above examples 1 and 2, it is also possible to obtain inventive catalysts when the mixed oxides mentioned therein are replaced by the mixed oxides designated hereinafter as a to i. They likewise feature good $NO_x$ conversion properties.

| Mixed oxide | $CeO_2$ [% by wt.] | $Nb_2O_5$ [% by wt.] | $RE_2O_3$/ [% by wt.] | $ZrO_2$ [% by wt.] |
| --- | --- | --- | --- | --- |
| a | 38 | 14.5 | $Nd_2O_3$/4.5 | 43 |
| b | 38 | 14.5 | $Y_2O_3$/4.5 | 43 |
| c | 38 | 14.5 | $La_2O_3$/4.5 | 43 |
| d | 25 | 15 | $Y_2O_3$/10 | 50 |
| e | 45 | 15 | $Nd_2O_3$/10 | 30 |
| f | 45 | 3 | $Nd_2O_3$/9 | 43 |
| g | 40 | 15 | $Y_2O_3$/3 | 42 |
| h | 35 | 10 | $Nd_2O_3$/6 | 49 |
| i | 50 | 20 | $Y_2O_3$/5 | 25 |

The invention claimed is:

1. A catalyst comprising
   a) a molecular sieve selected from the group consisting of chabazite, SAPO-34 and ALPO-34, containing 1 to 10% by weight of copper calculated as copper(II) oxide and based on the total weight of the molecular sieve; and
   b) a mixed oxide consisting of
   oxides of cerium, of zirconium, of niobium and of one or more rare earth elements or of oxides of cerium, of zirconium, of niobium, of tungsten and of one or more rare earth elements;
      wherein the weight ratio between molecular sieve and mixed oxide is 3:1 to 10:1.

2. The catalyst as claimed in claim 1, wherein the copper content of the molecular sieve is 1 to 5% by weight, calculated as copper(II) oxide and based on the total weight of the molecular sieve.

3. The catalyst as claimed in claim 1, wherein the mixed oxide consists of cerium oxide in an amount of 15 to 50% by weight, calculated as $CeO_2$,
   niobium oxide in an amount of 3 to 25% by weight, calculated as $Nb_2O_5$,
   rare earth oxide in an amount of 3 to 10% by weight, calculated as $RE_2O_3$, and zirconium oxide in an amount of 15 to 79% by weight, calculated as $ZrO_2$,
   based in each case on the total amount of the mixed oxide, where RE represents a rare earth element.

4. The catalyst as claimed in claim 1, wherein the mixed oxide consists of cerium oxide in an amount of 25 to 45% by weight, calculated as $CeO_2$,
   niobium oxide in an amount of 3 to 20% by weight, calculated as $Nb_2O_5$, rare earth oxide in an amount of 3 to 10% by weight, calculated as $RE_2O_3$, and zirconium oxide in an amount of 25 to 69% by weight, calculated as $ZrO_2$, based in each case on the total amount of the mixed oxide, where RE represents a rare earth element.

5. The catalyst as claimed in claim 1, wherein the mixed oxide consists of cerium oxide in an amount of 35 to 40% by weight, calculated as $CeO_2$, niobium oxide in an amount of 10 to 15% by weight, calculated as $Nb_2O_5$, rare earth oxide in an amount of 3 to 6% by weight, calculated as $RE_2O_3$, and zirconium oxide in an amount of 39 to 52% by weight, calculated as $ZrO_2$, based in each case on the total amount of the mixed oxide, where RE represents a rare earth element.

6. The catalyst as claimed in claim 1, wherein the mixed oxide consists of cerium oxide in an amount of 20 to 35% by weight, calculated as $CeO_2$, niobium oxide in an amount of 4 to 9% by weight, calculated as $Nb_2O_5$, rare earth oxide in an amount of 3 to 8% by weight, calculated as $RE_2O_3$, tungsten oxide in an amount of 10 to 20% by weight, calculated as $WO_3$, and zirconium oxide in an amount of 40 to 55% by weight, calculated as $ZrO_2$, based in each case on the total amount of the mixed oxide, where RE represents a rare earth element.

7. The catalyst as claimed in claim 1, wherein the catalyst is in the form of at least one coating on a catalytically inert support body.

8. The catalyst as claimed in claim 7, wherein the molecular sieve and mixed oxide are present in spatial separation in different layers on the support body and the layers are arranged as a horizontal succession of zones in flow direction of the exhaust gas.

9. The catalyst as claimed in claim 7, wherein the molecular sieve and mixed oxide are present in spatial separation in different layers on the support body and the layers are arranged in vertical superposition over the entire length of the support body.

10. A process for selective catalytic reduction of nitrogen oxides in exhaust gases of diesel engines, by
  i. adding ammonia or a precursor compound from which ammonia can be formed from a source independent of the engine to the exhaust gas which comprises nitrogen oxides and is to he cleaned, wherein adding the ammonia or the precursor compound to the exhaust gas forms a mixture, and
  ii. passing the mixture produced in step i. over a catalyst, wherein the catalyst comprises
  a) a molecular sieve selected from the group consisting of chabazite, SAPO-34 and ALPO-34, containing 1 to 10% by weight of copper calculated as copper(II) oxide, based on the total weight of the molecular sieve; and
  b) a mixed oxide consisting of
  oxides of cerium, of zirconium, of niobium and of one or more rare earth elements or of oxides of cerium, of zirconium, of niobium, of tungsten and of one or more rare earth elements.

* * * * *